(12) United States Patent
Choi et al.

(10) Patent No.: US 11,578,152 B2
(45) Date of Patent: Feb. 14, 2023

(54) CATIONIC METAL COMPLEX, ORGANOMETAL CATALYST HAVING BORATE-BASED BULKY ANION, METHOD FOR PREPARING THE SAME, AND METHOD FOR PREPARING OLIGOMER OR POLYMER USING THE SAME

(71) Applicant: LG Chem, Ltd., Seoul (KR)

(72) Inventors: Gyeong Shin Choi, Daejeon (KR); Dong Hyun Jo, Daejeon (KR); Won Hee Kim, Daejeon (KR); Seung Young Park, Daejeon (KR); Hyun Taek Oh, Daejeon (KR)

(73) Assignee: LG Chem, Ltd.

( * ) Notice: Subject to any disclaimer, the term of this patent is extended or adjusted under 35 U.S.C. 154(b) by 345 days.

(21) Appl. No.: 16/754,077

(22) PCT Filed: Apr. 5, 2019

(86) PCT No.: PCT/KR2019/004028
§ 371 (c)(1),
(2) Date: Apr. 6, 2020

(87) PCT Pub. No.: WO2019/194614
PCT Pub. Date: Oct. 10, 2019

(65) Prior Publication Data
US 2020/0308323 A1    Oct. 1, 2020

(30) Foreign Application Priority Data
Apr. 5, 2018    (KR) .................. 10-2018-0039698

(51) Int. Cl.
| | | |
|---|---|---|
| B01J 31/00 | (2006.01) | |
| C08F 110/10 | (2006.01) | |
| B01J 31/18 | (2006.01) | |

(52) U.S. Cl.
CPC ......... *C08F 110/10* (2013.01); *B01J 31/1805* (2013.01); *B01J 2231/20* (2013.01); *B01J 2531/31* (2013.01); *B01J 2531/32* (2013.01); *B01J 2531/33* (2013.01)

(58) Field of Classification Search
None
See application file for complete search history.

(56) References Cited

U.S. PATENT DOCUMENTS

| | | |
|---|---|---|
| 6,008,307 A | 12/1999 | Shaffer |
| 6,350,832 B1 | 2/2002 | Bell et al. |
| 2002/0028897 A1 | 3/2002 | Johnson et al. |
| 2002/0032289 A1 | 3/2002 | Wang et al. |
| 2002/0037982 A1 | 3/2002 | Johnson et al. |
| 2003/0088135 A1 | 5/2003 | Yun et al. |
| 2003/0176606 A1 | 9/2003 | Bohnenpoll et al. |
| 2008/0221285 A1 | 9/2008 | Walter et al. |
| 2008/0249267 A1 | 10/2008 | Hanefeld et al. |
| 2008/0293900 A1 | 11/2008 | Hanefeld et al. |
| 2010/0292422 A1 | 11/2010 | Rath et al. |

FOREIGN PATENT DOCUMENTS

| | | |
|---|---|---|
| CN | 1626558 A | 6/2005 |
| CN | 101282785 A | 10/2008 |
| CN | 101331159 A | 12/2008 |
| EP | 1155057 A1 | 11/2001 |
| JP | H10504048 A | 4/1998 |
| JP | 2003277428 A | 10/2003 |
| JP | 2016210940 A | 12/2016 |
| KR | 100486044 B1 | 4/2005 |
| KR | 20080044870 A | 5/2008 |
| KR | 20080078654 A | 8/2008 |
| WO | 0034344 A1 | 6/2000 |
| WO | 2007020248 A1 | 2/2007 |
| WO | WO 2011/109878 A1 * | 9/2011 |
| WO | 2018015306 A1 | 1/2018 |

OTHER PUBLICATIONS

Hijazi et al. Eur. J. Inorg. Chem., 2892-2898 (Year: 2008).*
Ding et al., "On Approaching the Limit of Molecular Magnetic Anisotropy: A Near-Perfect Pentagonal Bipyramidal Dysprosium(III) Single-Molecule Magnet", Angewandte Chemie International Edition, Nov. 2016, vol. 55, pp. 16071-16074.
Evans et al., "Divalent lanthanide complexes free of coordinating anions: facile synthesis of fully solvated dicationic [LnLx]2+ compounds", Polyhedron, Jan. 2003, vol. 22, Issue 1, pp. 119-126.
International Search Report from Application No. PCT/KR2019/004028 dated Jul. 9, 2019, 2 pages.
Kaliner et al., "Tunable aryl alkyl ionic liquids with weakly coordinating bulky borate anion", Tetrahedron Letters, Jun. 2016, vol. 57, No. 31, pp. 3453-3456.
Kuhn et al., "Solvent stabilized transition metal cations as initiators for cyclopentadiene polymerization", Macromolecular Rapid Communications, Sep. 1999, vol. 20, No. 10, pp. 555-559.
Li et al., "Metallocene-catalyzed olefin polymerizations using triphenylcyclopropenium tetrakis (pentafluorophenyl) borate as the activator", Canadian Journal of Chemistry, Jun. 2003, vol. 81, No. 6, pp. 758-763.
Rach et al., "On the Way to Improve the Enviromnental Benignity of Chemical Processes: Novel Catalysts for a Polymerization Process", Sustainability, Mar. 2009, vol. I, No. 1, pp. 35-42.
Sakiyama et al., "Structural Feature of an Octakis-DMSO Cerium(III) Complex: Tetragonal Antiprismatic Coordination Geometry along the c Axis", The Japan Society for Analytical Chemistry, X-ray Structure Analysis Online, May 2014, vol. 30, pp. 19-20, Retreived <https://doi.org/10.2116/xraystruct.30.19>.
Sone et al., "Thermochemical Studies on the Lanthanoid Complexes of N,N,N',N'-Tetramethylurea", The Chemical Society of Japan, Bulletin, Feb. 1982, vol. 55, No. 2, pp. 449-452.

(Continued)

*Primary Examiner* — Yun Qian
(74) *Attorney, Agent, or Firm* — Lerner, David, Littenberg, Krumholz & Mentlik, LLP

(57) ABSTRACT

The present invention provides an organometal catalyst having a cationic metal complex and a borate-based bulky anion, where the metal is one or more selected from the group consisting of metals in group 13, a method for preparing the same, and a method for preparing an oligomer or a polymer using the same.

17 Claims, No Drawings

(56) References Cited

OTHER PUBLICATIONS

Zhang et al., "Synthesis and Characterization of Imidazolium Salts with the Weakly Coordinating [B(C6F5)4]-Anion", Zeitschrift für Naturforschung B, Jul. 2012 pp. 1030-1036.
Zhang, Guofang, "Synthesis and Characterization of Metal-Metal Multiply Bonded Complexes and Catalytic Applications of Solvent Stabilized Transition Metal Complexes for Polymerization of Olefins", Dissertation, Technische Universität München, Jun. 18, 2001, pp. 1-155.
Ala'Aeddeen Swidan et al., "Polyether complexes of groups 13 and 14", Chemical Society Reviews, vol. 45, No. 14, Jan. 1, 2016, pp. 3883-3915.
Extended European Search Report including Written Opinion for Application No. EP19781903.0 dated Dec. 23, 2020, 9 pgs.
Yang Li et al. "Inorganic/organometallic catalysts and initiators involving weakly coordinating anions for isobutene polymerization", Coordination Chemistry Reviews, 255, 2011, pp. 1541-1557.
Search Report dated Feb. 22, 2022 from the Office Action for Chinese Application No. 201980004872.6 issued Mar. 3, 2022, pp. 1-3.

\* cited by examiner

CATIONIC METAL COMPLEX, ORGANOMETAL CATALYST HAVING BORATE-BASED BULKY ANION, METHOD FOR PREPARING THE SAME, AND METHOD FOR PREPARING OLIGOMER OR POLYMER USING THE SAME

CROSS-REFERENCE TO RELATED APPLICATIONS

The present application is a national phase entry under 35 U.S.C. § 371 of International Application No. PCT/KR2019/004028 filed on Apr. 5, 2019, which claims priority from Korean Patent Application No. 10-2018-0039698 filed Apr. 5, 2018, all of which are incorporated herein by reference.

TECHNICAL FIELD

The present invention relates to a cationic metal complex, an organometal catalyst having a borate-based bulky anion, a method for preparing the same, and a method for preparing an oligomer or a polymer using the same.

BACKGROUND ART

Generally, in a process for preparing an oligomer or a polymer by the cationic polymerization of monomers, a propagating polymer chain includes an active part which has a positive charge. For example, the active part may be a carbenium ion (carbon cation) or an oxonium ion.

As a catalyst or an initiator for such cationic polymerization, an aluminum- or boron-based Lewis acid is generally used. Examples of the Lewis acid catalyst include $AlX_3$, $BX_3$ (X=F, Br, Cl, I), etc., and the Lewis acid is a corrosive substance and produces halogen components such as HCl and HF during a quenching process, and this halogen components remain in a product to cause problems of degrading product quality. In addition, a Lewis acid catalyst requires a large amount of catalyst, and in order to remove the catalyst after reaction, a large amount of base (NaOH, KOH, $NH_4OH$, etc.) is used, and accordingly, additional washing with water is required and a large amount of waste water is produced.

Meanwhile, examples of the monomer which is capable of undergoing cationic polymerization include styrene, isobutene, cyclopentadiene, dicyclopentadiene and the derivatives thereof, and typical examples include polyisobutene obtained by polymerizing isobutene.

Polyisobutene is classified into a low molecular weight, medium molecular weight and high molecular weight range according to the range of molecular weight. The low molecular weight polyisobutene has a number average molecular weight range of about 10,000 or less, and includes product groups of common polybutene and high reactive polybutene (HR-PB) product. The high reactive polybutene includes carbon-carbon double bonds mainly positioned at the terminal of the polybutene, and after introducing a functional group using a vinylidene functional group at the terminal (>80%), the high reactive polybutene is used as a fuel additive or an engine oil additive. In order to polymerize such high reactive polybutene, a boron-based catalyst such as $BF_3$ is conventionally used, but this catalyst is toxic and has a gas type, and is difficult to handle. In addition, in order to increase reactivity and selectivity, a boron-alcohol or boron-ether composite is prepared and used, but there is a problem that the activity of the catalyst is reduced over time.

In addition, the medium molecular weight polyisobutene has a number average molecular weight in a range of about 30,000-100,000, and is mainly used in an adhesive, a sticking agent, a sealant and a wax, may be used as a reforming agent of polyethylene or mixed with a natural rubber or synthetic rubber to be used to improve aging resistance and ozone resistance.

Meanwhile, according to a solvent-ligated organometal catalyst studied by professor Kuhn of Technical University of Munich (Macromol. Rapid Commun., vol. 20, no. 10, pp. 555-559), the problems relating to the deterioration of product quality and corrosiveness due to the toxic component such as the conventional boron-based Lewis acid catalyst may be solved, but since the reaction time is fundamentally long and 16 hours, and the exo-content is decreased due to structural isomerization, the competitiveness is lower than the Lewis acid catalyst. In addition, in order to polymerize the medium molecular weight polyisobutene, chain transfer is required to be maximally decreased while increasing the molecular weight, and generally, the control thereof is performed by decreasing the temperature in cationic polymerization. However, the solvent-ligated organometal catalyst has low reactivity at a low temperature and does not show catalyst activity at less than 10° C., and thus, is not used as a catalyst for polymerizing a medium or higher molecular weight polyisobutene.

Meanwhile, a metal complex which has bulky counter anions $[M(NCCH_3)_6][B(C_6F_5)_4]$, is widely used as a precursor of various catalysts, and recently receives much attention as having activity which is capable of polymerizing isobutene. Generally, in order to prepare such compound, a metal complex is prepared using a photosensitive silver reagent, or a metal reagent of group 1 or group 2 such as lithium (Li), sodium (Na), potassium (K), and magnesium (Mg) according to the reaction below.

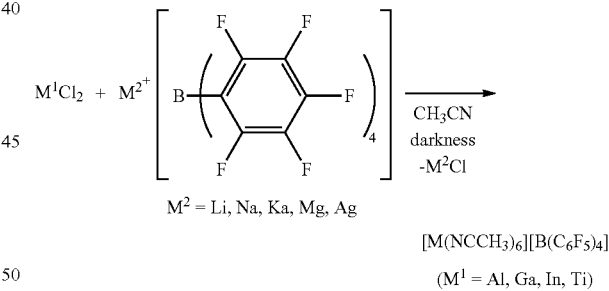

$M^2$ = Li, Na, Ka, Mg, Ag $[M(NCCH_3)_6][B(C_6F_5)_4]$ $(M^1 = Al, Ga, In, Ti)$

However, in the reaction, a metal salt ($M^2Cl$, $M^2$=Li, Na, Ka, Mg, Ag, etc.) is produced, and if this metal salt is incompletely removed and remain with the catalyst, the activity of a catalyst may be degraded due to poisoning. In addition, the yield is very low in the above-described method, and there are problems that a catalyst could not be prepared efficiently. Among them, a silver reagent having good reactivity is widely used, but if the silver reagent is used with a metal having a low oxidation potential, a metal may be easily oxidized, and its use is limited.

Generally, the preparation of such silver reagent follows a synthetic method according to the following Reactions (a) and (b):

(a)

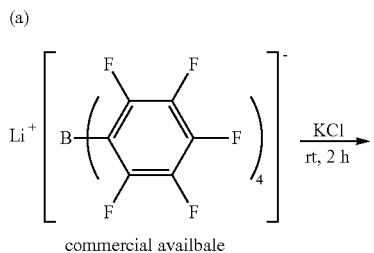

commercial availbale

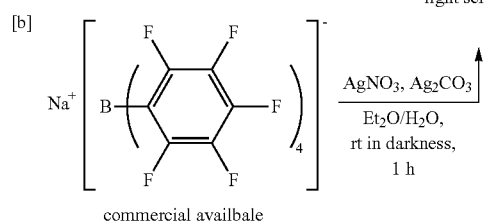

60-80% yield
light sensitive

[b]

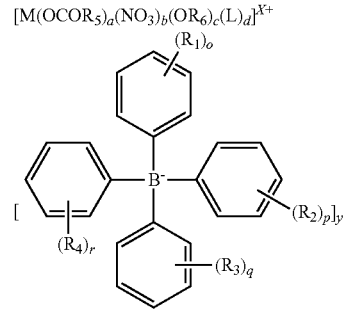

commercial availbale

In a metal chemistry field, which is sensitive to humidity, a method using KBArF (a) is preferred to a method using NaBArF (b) as a starting material. However, both methods require the use of an expensive silver reagent material ($AgNO_3$ or $Ag_2CO_3$), and there are defects of relatively low yield.

Meanwhile, a cationic polymerization method which is generally used for polymerizing a polyisobutene is very sensitive to humidity and impurities, and sometimes, the reaction may be terminated due to the reaction with a small amount of humidity or impurities during the propagation of a polymer chain or chain transfer may occur, and the preparation of a polymer having a high molecular weight is difficult. In case of preparing a catalyst using the metal complex prepared using the conventional silver reagent, the complete removal of a lithium salt, a sodium salt, a potassium salt, a magnesium salt or a silver salt, which are produced during a preparation process is difficult. Accordingly, such a salt is included in the polymerization reaction as impurities and the production of a polymer having a high molecular weight is difficult. In addition, due to the contamination, there are defects of deteriorating the activity of a catalyst.

As described above, the development of a catalyst which may polymerize both a polybutene oligomer having high exo-content and a medium or higher polyisobutene, does not contain a metal salt as a residual material and thus show improved activity, and thus may perform effective polymerization reaction with a small amount of the catalyst, is required.

PRIOR ART DOCUMENT

[Patent Document]

Korean Registration Patent Publication No. 10-0486044 (Apr. 29, 2005)

Non-Patent Document

Macromol. Rapid Commun., vol. 20, no. 10, pp. 555-559 (Sep. 16, 1999)

DISCLOSURE OF THE INVENTION

Technical Problem

An object of the present invention is to provide a novel organometal catalyst which may be used for preparing an oligomer and a polymer, and a method for preparing the same.

In addition, another object of the present invention is to provide a method for preparing an oligomer or a polymer using the organometal catalyst.

Technical Solution

Accordingly, the inventors of the present invention found that a novel organometal catalyst having excellent reactivity may be prepared by reacting a metal precursor (salt and/or alkoxide) including a metal selected from metals in group 13 with an organic borate-based compound containing a carbon-based, silyl-based or amine-based cation and a borate-based bulky anion, and a high reactive polyisobutene (HR-PB) may be produced by reacting at a high temperature using the same and a medium molecular weight polyisobutene may also be produced stably at a low temperature using the same, and completed the present invention.

An embodiment of the present invention provides an organometal catalyst having a cationic metal complex and a borate-based bulky anion, and being represented by the following Formula 1:

[Formula 1]

$$[M(OCOR_5)_a(NO_3)_b(OR_6)_c(L)_d]^{x+}$$

[structure with B$^-$ center bonded to four aryl groups bearing $(R_1)_o$, $(R_2)_p$, $(R_3)_q$, $(R_4)_r$ substituents]$_y$ In Formula 1, M is selected from the group consisting of metals in group 13, L is each independently a coordinating solvent molecule including a functional group selected from the group consisting of a cyanide group, an isocyanide group, an ether group, a pyridine group, an amide group, a sulfoxide group and a nitro group, $R_1$ to $R_4$ are each independently hydrogen, a halogen group, or a substituted or unsubstituted alkyl group of C1-C20, $R_5$ and $R_6$ are each independently hydrogen, an alkyl group of C1-C20, an aryl group of C6-C20, or an allyl group, a, b, c and a+b+c are each independently an integer of 0 to 3, d and a+b+c+d are each independently an integer of 1 to 10, o, p, q and r are each independently an integer of 1 to 5, and x and y are an integer of 1 to 4 and are the same.

Another embodiment of the present invention provides a method for preparing an organometal catalyst including a step of preparing a dispersion including a metal precursor represented by the following Formula 2 and a coordinating solvent; and a step of reacting an organic borate-based compound including a carbon-based, silyl-based or amine-based cation and a borate-based bulky anion with the dispersion:

[Formula 2]

In Formula 2,

M is selected from the group consisting of metals in group 13, $R_5$ and $R_6$ are each independently hydrogen, an alkyl group of C1-C20, an aryl group of C6-C20, or an allyl group, e, f, g and h are each independently an integer of 0 to 3, and e+f+g+h is 3.

Another embodiment of the present invention provides a method for preparing an oligomer or a polymer, including a step of cationically polymerizing a monomer using the organometal catalyst.

Advantageous Effects

The novel organometal catalyst of the present invention may be used as a substitution material for the conventional aluminum- or boron-based Lewis acid catalyst, and has a relatively small amount, and thus, is economical and eco-friendly. In addition, since the novel organometal catalyst of the present invention has excellent reactivity, an oligomer such as a high reactive polyisobutene may be prepared in an excellent conversion ratio by using thereof at room temperature.

Also, since the organometal catalyst of the present invention shows catalyst activity at a low temperature, the organometal catalyst may be used as a catalyst for polymerizing a polymer such as a medium molecular weight polyisobutene by decreasing the reaction temperature, and accordingly, the utilization degree of the organometal catalyst and a process using the same is high.

BEST MODE FOR CARRYING OUT THE INVENTION

Hereinafter, the present invention will be described in more detail in order to assist the understanding of the present invention. It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms used herein are for the purpose of describing particular embodiments only and are not intended to be limiting of the invention. The singular forms are intended to include the plural forms as well, unless the context clearly indicates otherwise.

It will be understood that the terms "comprises", "includes" or "has" in this disclosure, specify the presence of stated features, numerals, steps, elements or the combination thereof, but do not preclude the presence or addition of one or more other features, numerals, steps, elements or the combination thereof.

The term "oligomer" used in the present disclosure means a low polymer formed by oligomerizing a monomer and having a number average molecular weight in a range of less than 10,000.

The term "polymer" used in the present disclosure means a polymer compound formed by polymerizing a monomer and having a number average molecular weight of 10,000 or more.

The organometal catalyst of the present invention is developed as a novel catalyst which solves various problems of the conventional Lewis acid catalyst for the cationic polymerization of olefin. Accordingly, the conventional Lewis acid catalyst is corrosive but the organometal catalyst of the present invention is not corrosive. In addition, the organometal catalyst of the present invention requires a small amount used for obtaining equivalent degree of effects, and the catalyst cost is saved. In addition, in case of the conventional Lewis acid catalyst, a large amount of highly toxic waste water is produced during removing the catalyst through washing with a basic salt such as NaOH after finishing the reaction, but the organometal catalyst of the present invention may be removed simply through filtering, and the waste water is not produced. In addition, in case of the conventional Lewis acid catalyst, HF or HCl is produced during a quenching process, and halogen remains in a product to induce quality deterioration. However, such problems are solved in the organometal catalyst of the present invention and a clear product with high quality may be produced.

In an embodiment, the organometal catalyst may be represented by the following Formula 1:

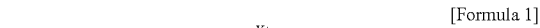

[Formula 1]

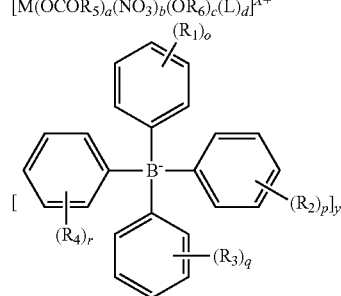

In Formula 1, M is selected from the group consisting of metals in group 13, and in an embodiment, may be one or more selected from the group consisting of Al, Ga, In and Tl.

L is each independently a coordinating solvent molecule including a functional group selected from the group consisting of a cyanide group, an isocyanide group, an ether group, a pyridine group, an amide group, a sulfoxide group and a nitro group. For example, L may be one or more selected from the group consisting of acetonitrile, propionitrile, 2-methylpropanenitrile, trimethylacetonitrile, benzonitrile, dialkyl ether such as diethyl ether and diallyl ether, pyridine, dimethylformamide, dimethyl sulfoxide, nitromethane, nitrobenzene and the derivatives thereof, where an unshared electron pair of oxygen, nitrogen or carbon makes a coordination bond with M.

$R_1$ to $R_4$ are each independently hydrogen, a halogen group, or a substituted or unsubstituted alkyl group of C1-C20, C1-C12 or C1-C4, preferably, a halogen-substituted alkyl group of C1-C4.

$R_5$ and $R_6$ are each independently hydrogen, an alkyl group of C1-C20, or C6-C20, or C1-C12, or C6-C12, or C1-C6, or C1-C4, or C1-C2, an aryl group of C6-C20, or an allyl group, a, b, c and a+b+c are each independently an integer of 0 to 3, d and a+b+c+d which is related to the coordination bond number of a metal are each independently an integer of 1 to 10, o, p, q and r are each independently an integer of 1 to 5, and x and y are an integer of 1 to 4 and the same.

In the organometal catalyst, the borate-based bulky anion may be one or more selected from the group consisting of tetrakis(phenyl)borate, tetrakis(pentafluorophenyl)borate, tetrakis[3,5-bis(trifluoromethyl)phenyl]borate, and the derivatives thereof.

Another embodiment of the present invention provides a method for preparing an organometal catalyst including a step of preparing a dispersion including a metal precursor (carboxylate, nitrate, hydroxide and/or alkoxide of a metal), and a coordinating solvent; and a step of reacting an organic borate-based compound including a carbon-based, silyl-based or amine-based cation and a borate-based bulky anion with the dispersion, wherein the metal is one or more selected from metals in group 13.

Hereinafter, the method for preparing an organometal catalyst of the present invention will be explained in particular.

<Preparation Method of Organometal Catalyst>

1) Preparation of Dispersion

The method for preparing an organometal catalyst of the present invention includes a step of preparing a dispersion including a metal precursor (carboxylate, nitrate, hydroxide and/or alkoxide of a metal), and a coordinating solvent.

[Formula 2]

In Formula 2,

M is selected from the group consisting of metals in group 13, and for example, may be one or more selected from the group consisting of Al, Ga, In and Tl. The oxidation number of the metal may be any one among 1 to 4 according to the kind of the metal.

$R_5$ and $R_6$ are each independently hydrogen or an alkyl group of C12-C20, or C6-C20, or C1-C12, or C6-C12, or C1-C6, or C1-C4, or C1-C2, an aryl group of C6-C20 or an allyl group.

In addition, e, f, g and h are each independently an integer of 0 to 3, and e+f+g+h is 3. In addition, the metal precursor used in the reaction may have an anhydrous metal compound or a hydrated metal compound type, without limitation.

In an embodiment, the metal precursor may be $M(NO_3)_3 \cdot B(H_2O)$, $M(OAc)_3 \cdot B(H_2O)$, $M(OR)_3 \cdot B(H_2O)$, $M(OAc)_{e'}(NO_3)_{f'}$, $M(OAc)_{e'}(OR)_{g'}$, or $M(NO_3)_{f'}(OR)_{g''}$. Here, R is each independently hydrogen or an alkyl group of C1-C20, or C6-C20, or C1-C12, or C6-C12, or C1-C6, or C1-C4, or C1-C2, an aryl group or an allyl group, e', f', and g' are each independently 1 or 2, e'+f', e'+g', and f'+g' are 3, and B is 1 to 10.

In addition, in the step of preparing a dispersion, the dispersion is characterized in including a Lewis base coordinating solvent. The coordinating solvent may be any solvents as long as making a coordination bond with a central metal, without specific limitation, and may be a nitrile-based solvent, for example, an alkyl cyanide or an aryl cyanide, an ether-based solvent, for example, a dialkyl ether, a pyridine-based solvent, an amide-based solvent, a sulfoxide-based solvent, or a nitro-based solvent.

For example, the coordinating solvent may include one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, nitrobenzene and the derivatives thereof.

In the step of preparing a dispersion of the present invention, an excessive amount of the coordinating solvent may be used with respect to the metal precursor. Preferably, the total amount of the coordinating solvent which reacts with the metal with respect to the metal precursor is controlled to achieve a molar ratio of at least 1:4, at least 1:6, at least 1:8, at least 1:12, at least 1:16, or at least 1:18. Most preferably, an amount range is controlled to achieve the molar ratio of 1:6 to 1:18, or 1:12 to 1:18.

In addition, the dispersion may further include a non-coordinating solvent, and any solvent which may dissolve the remaining metal precursor (metal salt or alkoxide) which is not used for the reaction or a material such as an organic borate and which may not make a coordination bond with the metal, may be used. Examples of the non-coordinating solvent may include one or more selected from the group consisting of benzene, alkyl benzene, for example, toluene, xylene or ethylbenzene, chlorobenzene, bromobenzene, chloroform and dichloromethane.

In case where the non-coordinating solvent is used as the solvent of the dispersion, the coordinating solvent which may react with the metal precursor and be bonded as the ligand of the metal may preferably be injected in a suitable amount with the molar ratio of at least 1:6, at least 1:12, or at least 1:18 with respect to the metal precursor. Most preferably, an amount range is controlled to achieve the molar ratio of 1:6 to 1:18.

Accordingly, the method of the present invention may further include a step of adding a coordinating solvent before or after the step of reacting the organic borate-based compound with the dispersion.

2) Reaction of Organic Borate-Based Compound with Dispersion

The method for preparing the organometal catalyst of the present invention may include a step of reacting an organic borate-based compound containing a carbon-based, silyl-based, or amine-based cation and a borate-based bulky anion, with the dispersion.

The organic borate-based compound may be represented by the following Formula 3:

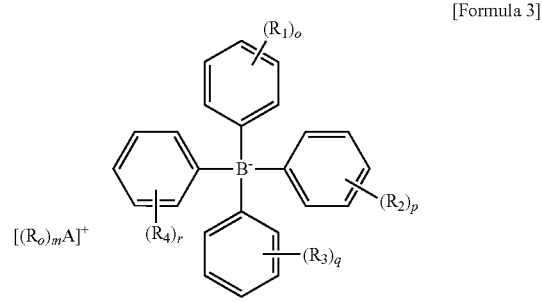

[Formula 3]

In Formula 3,

A is C, Si or N, $R_o$ is each independently hydrogen, an alkyl group of C1-C20, an alkoxy group of C1-C20, an aryl group of C6-C20, or an aryloxy group of C6-C20, preferably, hydrogen, an alkyl group of C1-C12, an alkoxy group of C1-C12, an aryl group of C6-C12, or an aryloxy group of C6-C12, more preferably, hydrogen, an alkyl group of C1-C6, or an alkoxy group of C1-C6, m is 3 if A is C or Si, and 4 if A is N;

$R_1$ to $R_4$ are each independently hydrogen, a halogen group, or a substituted or unsubstituted alkyl group of C1-C20, preferably, a halogen-substituted alkyl group of C1-C12, more preferably, a halogen-substituted alkyl group of C1-C4, and o, p, q and r are each independently an integer of 1 to 5.

The borate-based bulky anion may be one or more selected from the group consisting of tetrakis(phenyl)borate, tetrakis(pentafluorophenyl)borate, tetrakis[3,5-bis(trifluoromethyl)phenyl]borate, and the derivatives thereof.

The method for preparing the organometal catalyst of the present invention is characterized in using an organic borate-based reagent which is stable and commercially widely used instead of the conventional metal reagent, for example, a silver reagent which is photosensitive, expensive and difficult to synthesize. There were problems of remaining a metal halide together with a catalyst in the catalyst prepared by the conventional method to deteriorate catalyst activity and show poisoning. On the contrary, in this case, a metal halide is not present, and catalyst activity is increased and polymerization reaction may be efficiently performed with a small amount used, and the molecular weight of an oligomer and a polymer may be easily controlled.

[Reaction 1]

$M(OCOR_5)_e(NO_3)_f(OR_6)_g$ +

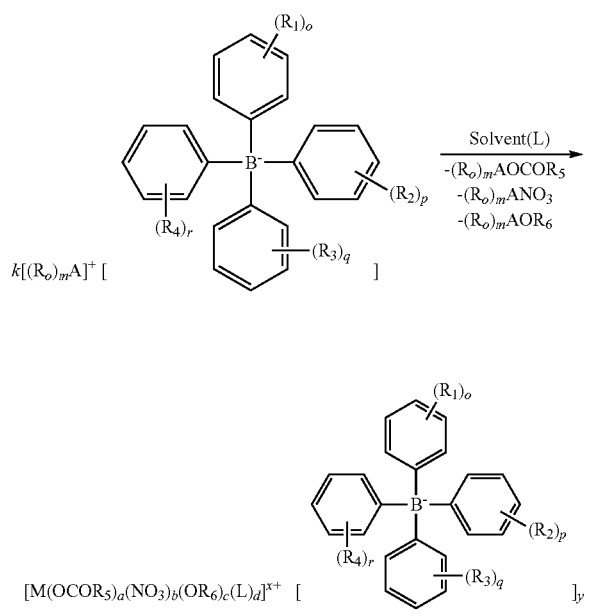

In Reaction 1, the definition of M; L; $R_1$ to $R_6$; a, b, c and d; o, p, q and r; x and y is the same as described above.

In an embodiment, if a metal carboxylate $M(OCOR_5)_e$ is used in the preparation method of an organometal catalyst of the present invention, the reaction of the organic borate-based compound and the dispersion may be performed according to Reaction 2 below. In addition, the metal used in the reaction may have all types of an anhydrous metal compound $M(OCOR_5)_e$ or a hydrated metal compound $(M(OCOR_5)_e \cdot B(H_2O)$, a=1-3, B=1-10).

[Reaction 2]

$M(OCOR_5)_e$ +

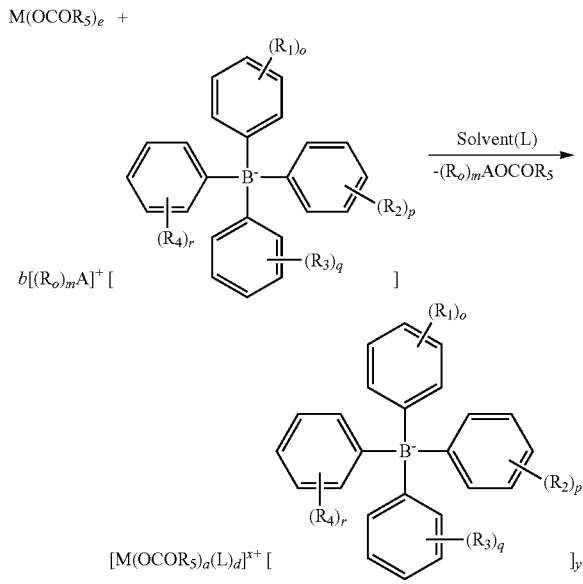

In addition, if a metal nitrate $M(NO_3)_f$ is used, the reaction of the organic borate-based compound and the dispersion may be performed according to Reaction 3 below. In addition, the metal used in the reaction may have all types of an anhydrous metal compound $M(NO_3)_f$ or a hydrated metal compound $(M(NO_3)_f \cdot B(H_2O)$, a=1-3, B=1-10).

[Reaction 3]

$M(NO_3)_l$ +

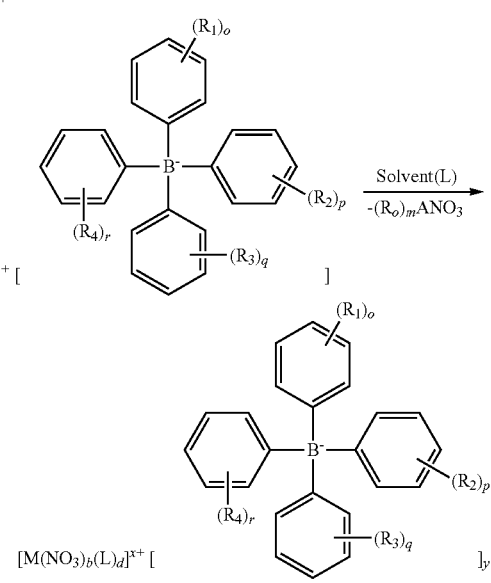

In addition, if a metal hydroxide or alkoxide $M(OR_6)_g$ (R=hydrogen, an alkyl group, an aryl group, or an allyl group) is used, the reaction of the organic borate-based compound and the dispersion may be performed according to Reaction 4 below. In addition, the metal used in the reaction may have all types of an anhydrous metal compound $M(OR_6)_g$ or a hydrated metal compound $(M(OR_6)_g \cdot B(H_2O)$, a=1-3, B=1-10).

[Reaction 4]

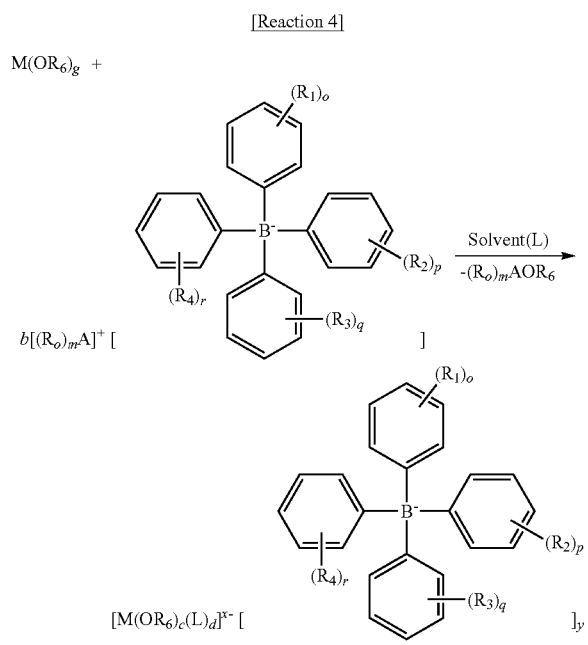

In addition, if an organometal catalyst is prepared using a metal halide $M(X)_n$ (X=Cl, Br, I) as a starting material, the reaction of the organic borate-based compound and the dispersion may be performed according to following Reaction 5 below. In addition, the metal used in the reaction may preferably be an anhydrous metal compound $(M(X)_n)$ type.

[Reaction 5]

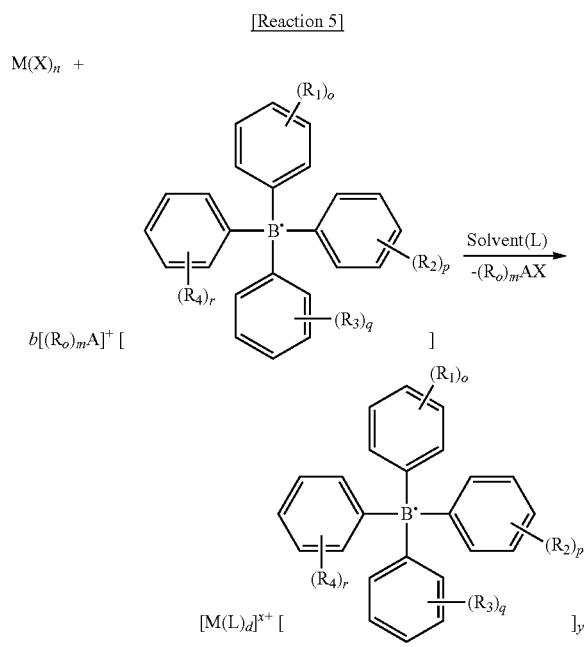

The catalyst prepared by the conventional method surely included a metal halide as a by-product, but the catalyst of the present invention is characterized in being prepared by the above-mentioned reaction and not containing a metal halide, particularly, a metal halide of one or more metals selected from the group consisting of metals in group 1, group 2 and group 11. Particularly, a salt such as silver chloride (AgCl), lithium chloride (LiCl), sodium chloride (NaCl), potassium chloride (KCl), magnesium chloride ($MgCl_2$) silver bromide (AgBr), lithium bromide (LiBr), sodium bromide (NaBr), potassium bromide (KBr), magnesium bromide ($MgBr_2$), silver iodide (AgI), lithium iodide (LiI), sodium iodide (NaI), potassium iodide (KI) and magnesium iodide ($MgI_2$) is not included, and the catalyst contamination may be prevented and high catalyst activity may be shown with a small amount.

In the reaction step of the present invention, the metal precursor and the organic borate-based compound has a molar ratio of 1:1 to 1:4, and may be used in an equivalent quantity of a metal salt or alkoxide to be removed.

In addition, the reaction step may be performed by stirring the reactants at room temperature for 2 to 5 hours.

The method for preparing an organometal catalyst of the present invention may further include a step of dissolving the organic borate-based compound in a coordinating solvent or a non-coordinating solvent prior to reacting with the dispersion. There is no problem if the amount of the organic borate-based compound is small, but if a large amount is prepared and the reaction is undergone without being dissolved in a solvent, side reactions may arise due to heating, and yield may decrease.

In this case, the amount of the coordinating solvent or the non-coordinating solvent is not limited. However, the total amount of the coordinating solvent in the reaction step is preferably controlled with respect to the metal precursor to achieve a molar ratio of at least 1:4, at least 1:6, at least 1:8, at least 1:10, at least 1:12, at least 1:16, or at least 1:18.

For example, the molar ratio of the organic borate-based compound with the coordinating solvent or non-coordinating solvent may be 1:2 to 1:5, or 1:7 to 1:10.

For example, the method of the present invention may further include a step of adding a coordinating solvent to the reactant after the step of reacting the organic borate-based compound with the dispersion.

The method for preparing the organometal catalyst of the present invention may further include a step of washing the catalyst obtained in the reaction step with an organic solvent or distilling. In an embodiment, $(R_O)_3AOCOR$, $(R_O)_3ANO_3$ or $(R_O)_3AOR$ (A=C or Si, $R_O$=each independently hydrogen, an alkyl group, an alkoxy group, an aryl group or an aryloxy group, and R=hydrogen, alkyl, aryl or allyl) produced in the reaction step may be easily removed by simply washing with an organic solvent or distilling. In case of using an amine-based borate, HOAc or $HNO_3$ produced together with aniline may also be easily removed through washing or distilling.

The organic solvent may include one or more selected from the group consisting of a linear or cyclic alkyl solvent, for example, pentane, cyclopentane, hexane, cyclohexane, heptane, or octane, and an ether solvent, for example, diethyl ether, or petroleum ether.

<Method for Preparing Oligomer or Polymer>

The present invention provides as another embodiment, a method for preparing an oligomer or a polymer, including a step of cationically polymerizing a monomer using the organometal catalyst.

The monomer may be one or more selected from the group consisting of styrene, isobutene, cyclopentadiene, dicyclopentadiene, tetrahydrofuran and the derivatives thereof.

In an embodiment, the oligomer includes polytetramethylene ether glycol (PTMEG) formed by oligomerizing a monomer such as tetrahydrofuran (THF).

In addition, in the step of cationically polymerizing the monomer, the amount of the monomer based on the weight of the total reactant may be 1 to 50 wt %, preferably, 5 to 25 wt %. In addition, the amount of the catalyst based on the total reactant may be 0.005 to 1 wt %, preferably, or 0.01 to 0.025 wt %.

In addition, the exo-content of the high reactive polybutene having a number average molecular weight of less than 10,000 among the olefin-based polymer prepared by the preparation method, may be 50 to 99%, preferably, 80 to 99%. The exo-content represents a case where a carbon-carbon double bond is positioned at the terminal of the polyolefin, and if the exo-content increases, it means that high reactive polyolefin, for example, polybutene (HR-PB) is produced well.

In addition, the oligomer with a low molecular weight may have a number average molecular weight of 1,000 to 3,300, or 1,500 to 3,000, and a polymer with a medium or higher molecular weight may have a number average molecular weight of 10,000 to 100,000, preferably, 40,000 to 80,000.

In addition, the polydispersity (PDI) of the oligomer or the polymer may be 1.5 to 3, preferably, 1.8 to 2.5.

<Removal of Catalyst after Polymerizing Oligomer or Polymer>

A step of removing the catalyst may be further performed after polymerizing the oligomer or the polymer. The organometal catalyst of the present invention may be easily removed through a step of simple filtering, and in this regard, has a great advantage when compared with the conventional Lewis acid catalyst.

In an embodiment, after polymerizing the oligomer or the polymer, the organic solvent may be removed to control the amount of the organic solvent to 40 wt % or less, 20 wt % or less, or 5 wt % or less of the polymer.

Then, in case of a polymer with flowability, a step of filtering an insoluble material using a glass filter having 80 mesh or more, 100 mesh or more, or 200 mesh or more is performed. Alternatively, the catalyst may be removed by passing the polymer with flowability through a silica, celite or zeolite filter.

Meanwhile, in case of a polymer with low flowability, the polymer is imparted with flowability using one or more among a linear or cyclic alkyl solvent, for example, pentane, cyclopentane, hexane, cyclohexane, heptane and octane, and an ether solvent, for example, diethyl ether and petroleum ether, and then, the step of filtering through the glass filter, silica, celite or zeolite filter may be performed.

Generally, the oligomer or the polymer thus produced is dissolved in an organic solvent such as pentane, cyclopentane, hexane, cyclohexane, heptane, octane, diethyl ether and petroleum ether, and then washed to remove the organometal catalyst. However, the organometal catalyst may be efficiently removed by the above-described simple filtering in the present invention, and the washing step may not be performed.

Hereinafter, embodiments of the present invention will be described in detail so as to assist the understanding of the present invention. However, the embodiments below are only illustrations, and the invention may be changed and modified in many different forms and should not be construed as being limited to the embodiments set forth herein, and such change and modification should be included in attached claims.

EXAMPLES

Preparation Example 1

<Preparation of Organometal Catalyst>

In a glove box, 100 mg of $Ga(NO_3)_3 \cdot xH_2O$ (x=1-10) (purchased from Sigma-Aldrich) was put into a vial together with a magnetic bar, and 2 ml of an acetonitrile solvent was added thereto. To another vial, 3 equivalents of a metal precursor of $[Et_3Si][B(C_6F_5)_4]$ (purchased from Asahi Glass Co.) was put, and 3 ml of an acetonitrile solvent was also added thereto for dissolving. To $Ga(OAc)_3$ while stirring, $[Et_3Si][B(C_6F_5)_4]$ dissolved in acetonitrile was slowly added. Then, stirring was performed at room temperature for 5 hours. After removing all solvents in vacuum, washing was performed with benzene and hexane. The remaining material was sufficiently dried in vacuum to obtain an organometal catalyst $[Ga(MeCN)_6][B(C_6F_5)_4]_3$ as a powder type.

$[Ga(MeCN)_6][B(C_6F_5)_4]_3$ (92% yield): Selected IR (KBr): $vCN$=2312, 2276 $cm^{-1}$; elemental analysis calcd (%) for $C_{84}H_{18}B_3GaF_{60}N_6$: C, 42.88, H, 0.77, N, 3.57. Found: C, 43.17; H, 0.99; N, 3.24.

Preparation Example 2

An organometal catalyst $[In(MeCN)_6][B(C_6F_5)_4]_3$ of a powder type was prepared by the same method in the preparation of the organometal catalyst of Preparation Example 1 except for using 100 mg of $In(OAc)_3$ (purchased from Sigma-Aldrich) instead of $Ga(NO_3)_3 \cdot xH_2O$.

$[In(MeCN)_6][B(C_6F_5)_4]_3$ (94% yield): Selected IR (KBr): $vCN$=2317, 2241 $cm^{-1}$; elemental analysis calcd (%) for $C_{84}H_{18}B_3InF_{60}N_6$: C, 42.07, H, 0.76, N, 3.50. Found: C, 42.21; H, 0.89; N, 3.41.

Preparation Example 3

An organometal catalyst $[Al(MeCN)_6][B(C_6F_5)_4]_3$ of a powder type was prepared by the same method in the preparation of the organometal catalyst of Preparation Example 1 except for using 100 mg of $AlCl_3$ (purchased from Sigma-Aldrich) instead of $Ga(NO_3)_3 \cdot xH_2O$.

$[Al(MeCN)_6][B(C_6F_5)_4]_3$ (96% yield): Selected IR (KBr): $vCN$=2330, 2310 $cm^{-1}$; elemental analysis calcd (%) for $C_{84}H_{18}AlB_3F_{60}N_6$: C, 43.67; H, 0.79; N, 3.64. Found: C, 44.02; H, 1.12; N, 3.53.

Comparative Preparation Example 1

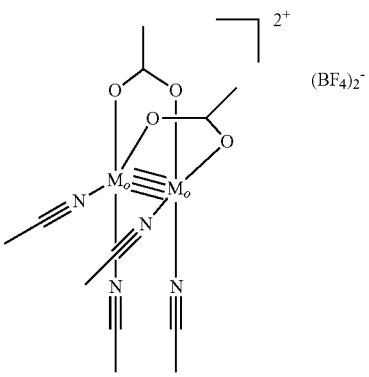

Under an argon atmosphere in a glove box, 100 mg of molybdenum(II) acetate ($Mo_2C_8H_{16}O_8$) was dissolved in a mixture solvent of 2 ml of dichloromethane and 1 ml of acetonitrile and stirred. 3 ml of dichloromethane in which 1.0 M of $(C_2H_5)_{30}BF_4$ was dissolved was slowly added to the molybdenum acetate solution while stirring. After stirring at room temperature for 3 hours, all organic solvents were removed under reduced pressure conditions. The red product thus obtained was washed with 3 ml of hexane three times. The organic solvents were removed again under reduced pressure conditions to prepare an organometal catalyst in a powder type.

Selected IR (KBr): $\nu CN=2293, 2256$ cm$^{-1}$; elemental analysis calcd (%) for $C_{16}H_{24}B_2F_8Mo_2N_6O_4$: C, 26.33, H, 3.31, N, 11.51. Found: C, 26.23; H, 3.18; N, 11.31.

Comparative Preparation Example 2

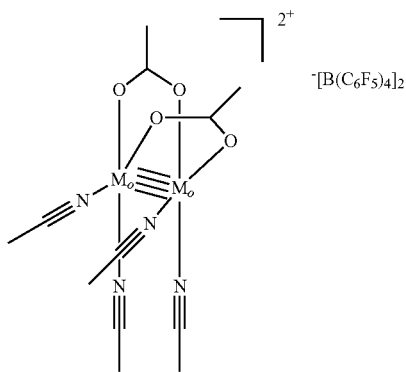

Under an argon atmosphere in a glove box, 100 mg of molybdenum(II) acetate was put in 2 ml of acetonitrile and stirred into a dispersion type. 2 equivalents of a metal precursor, $[Et_3Si][B(C_6F_5)_4]$ (368 mg) (purchased from Asahi Glass Co.) was dissolved in 2 ml of acetonitrile and added to the molybdenum(II) acetate while stirring. Stirring was performed further at room temperature for 5 hours, and all organic solvents were removed in vacuum. Remaining solid was washed with hexane three times and dried in vacuum to prepare a $[Mo_2 (OAc)_2 (MeCN)_4][B(C_6F_5)_4]_2$ (MeCN) 2 organometal catalyst, having a bulky anion instead of the $BF_4$ anion of Comparative Example 1 in a power type (quantitative yield).

Selected IR (KBr): $\nu CN=2317, 2285$ cm$^{-1}$; elemental analysis calcd (%) for $C_{64}H_{26}B_2F_{40}Mo_2N_6O_4$: C, 40.11, H, 1.37, N, 4.39. Found: C, 39.91; H, 1.29; N, 4.31.

Comparative Preparation Examples 3 and 4

In a glove box, 100 mg of $M(OAc)_2$ (M is Fe and Cu in Comparative Preparation Examples 2 and 3, respectively) was put into a vial together with a magnetic bar, and 1 ml of an acetonitrile solvent was added thereto. To another vial, 2 equivalents of a metal precursor of $[Et_3Si] [B(C_6F_5)_4]$ (purchased from Asahi Glass Co.) was put, and 3 ml of an acetonitrile solvent was also added thereto for dissolving. To $M(OAc)_2$ while stirring, $[Et_3Si][B(C_6F_5)_4]$ dissolved in acetonitrile was slowly added. Then, stirring was performed at room temperature for 5 hours. After removing all solvents in vacuum, remaining material was washed with hexane. Drying was performed under reduced pressure conditions to obtain an organometal catalyst in a powder type. The powder thus obtained was stored at −30° C.

Here, $Fe(OAc)_2$ was purchased from Alfa Aesar Co., and $Cu(OAc)_2$ was purchased from Aldrich Co., and used.

① $[Fe(NCCH_3)_6][B(C_6F_5)_4]_2$ (quantitative yield), Selected IR (KBr): $\nu CN=2312, 2285$ cm$^{-1}$; elemental analysis calcd (%) for $C_{60}H_{18}B_2FeF_{40}N_6$: C, 43.41, H, 1.09, N, 5.06. Found: C, 43.77; H, 1.21; N, 5.11.

② $[Cu(NCCH_3)_6][B(C_6F_5)_4]_2$ (quantitative yield), Selected IR (KBr): $\nu CN=2308, 2275$ cm$^{-1}$; elemental analysis calcd (%) for $C_{60}H_{18}B_2CuF_{40}N_6$: C, 43.21, H, 1.09, N, 5.04. Found: C, 43.45; H, 1.31; N, 4.97.

Comparative Preparation Example 5

An experiment was performed in a glove box while minimizing light exposure. 0.19 g (1.12 mmol) of $AgNO_3$ was dissolved in 5 ml of an anhydrous acetonitrile solution and then slowly added to 10 ml of anhydrous acetonitrile in which 1.00 g (1.39 mmol) of $K[B(C_6F_{O4}]$ (Alfa Aesar Co.) was dissolved. After 1 hour, all solvents were removed under a reduced pressure. Then, the resultant product was dissolved in dichloromethane and a $KNO_3$ salt which was a by-product was removed by filtering. Solvents were partially removed under reduced pressure conditions, and hexane was added thereto and crystallization was performed at −30° C. to produce 0.84 g of Ag $[B(C_6F_5)]_4$ (77% yield).

$AlCl_3$ (Aldrich Co.) was added to a dried solution of a silver salt in acetonitrile. The mixture thus obtained was stirred in a dark room for 2 hours. After filtering, solvents were removed in high-degree vacuum to produce a crude product, and this crude product was re-dissolved in dry dichloromethane. A small amount of precipitate was removed by filtering, and solvents were removed under high-degree vacuum to obtain a desired product.

$[Al(NCCH_3)_6][B(C_6F_5)_4]_3$ (38% yield), Selected IR (KBr): $\nu CN=2330, 2310$ cm$^{-1}$; elemental analysis calcd (%) for $C_{84}H_{18}AlB_3F_{60}N_6$: C, 43.67, H, 0.79, N, 3.64. Found: C, 44.17; H, 1.21; N, 4.21.

Comparative Preparation Example 6

$[Al(NCCH_3)_6][BArF]_3$ was synthesized by the same method as in Comparative Example 1 except for using NaBArF (BArF=sodium tetrakis[3,5-bis(trifluoromethyl)phenyl]borate) instead of $Ag[B(C_6F_5)]_4$.

$[Al(NCCH_3)_6][BArF]_3$ (−7% yield), Selected IR (KBr): $\nu CN=2334, 2313$ cm$^{-1}$; elemental analysis calcd (%) for $C_{108}H_{54}AlB_3F_{72}N_6$: C, 45.31, H, 1.90, N, 2.94. Found: C, 45.74; H, 2.28; N, 3.16.

Experimental Example 1

<Polymerization of Polyisobutene>

To an andrew glass flask well-dried in a convection oven, a magnetic bar was put and vacuum was applied and maintained for about 1 hour. An ice-bath was manufactured using acetone-dry ice, the andrew glass flask was cooled, and an isobutene line was connected to condense an appropriate amount. The amount of isobutene put in the andrew glass flask was confirmed, and dry dichloromethane was put to adjust a desired isobutene concentration. The temperature of the andrew glass flask thus prepared was elevated to 30° C. The catalyst used was prepared in a glove box, dissolved in a small amount of dichloromethane, and injected using a syringe. After 2 hours from the injection, the andrew glass flask was opened, remaining isobutene was removed, and the reaction was quenched using methanol. The remaining solvents were removed using a rotary evaporator, and remaining polymer was completely dried in vacuum until no weight change was observed.

Polyisobutenes of Examples 1 to 7 and Comparative Examples 1 to 3 were prepared using each catalyst of Preparation Examples 1 and 2, and Comparative Preparation Examples 1 to 3, and the polymerization results are listed in Table 1 below. In this case, the exo-content, a weight average molecular weight, a number average molecular weight and a PDI value were measured as follows:

① Exo-olefin and endo-olefin types were secured according to the position of a double bond by measuring $^1$H NMR using Varian 500 MHz NMR, and the exo-content (%) was calculated according to the following equation:

Exo-content (%)=(exo-olefin content where carbon-carbon double bond is positioned at terminal/total content of exo-olefin and endo-olefin obtained)*100

② Weight average molecular weight and number average molecular weight: the oligomer/polymer thus produced were measured under the following gel permeation chromatography (GPC) analysis conditions:
Column: PL MiniMixed B×2
Solvent: THF
Flow rate: 0.3 ml/min
Specimen concentration: 2.0 mg/ml
Injection amount: 10 μl
Column temperature: 40° C.
Detector: Agilent RI detector
Standard: polystyrene (corrected by a cubic function)
Data processing: ChemStation ③ Polydispersity (PDI)=weight average molecular weight (Mw)/number average molecular weight (Mn)

TABLE 1

| | Catalyst | TB Conc. (wt %, in solvent DCM) | Catalyst injection (wt %) | Temp. (° C.) | Time (min) | Conversion ratio (%) | Exo-content | Mn | PDI |
|---|---|---|---|---|---|---|---|---|---|
| Example 1 | Preparation Example 1 | 20 | $5.0 \times 10^{-3}$ | 30 | 45 | 99 | 88 | 3050 | 2.7 |
| Example 2 | | 20 | $5.0 \times 10^{-2}$ | 0 | 45 | 91 | — | 13900 | 2.5 |
| Example 3 | | 20 | $5.0 \times 10^{-2}$ | −10 | 45 | 94 | — | 38600 | 2.0 |
| Example 4 | | 20 | $5.0 \times 10^{-2}$ | −30 | 45 | 92 | — | 51300 | 1.8 |
| Example 5 | Preparation Example 2 | 20 | $5.0 \times 10^{-3}$ | 30 | 120 | 99 | 89 | 2380 | 2.3 |
| Example 6 | | 20 | $2.5 \times 10^{-4}$ | 30 | 120 | 99 | 92 | 4930 | 2.2 |
| Example 7 | | 20 | $2.5 \times 10^{-2}$ | −10 | 45 | 93 | — | 41800 | 1.9 |
| Example 8 | | 20 | $2.5 \times 10^{-2}$ | −20 | 45 | 94 | — | 75700 | 2.1 |
| Example 9 | Preparation Example 3 | 20 | $2.5 \times 10^{-2}$ | 30 | 45 | 89 | 92 | 2000 | 2.1 |
| Example 10 | | 20 | $5.0 \times 10^{-2}$ | −20 | 45 | 86 | — | 64700 | 2.1 |
| Example 11 | | 20 | $1.0 \times 10^{-3}$ | −40 | 45 | 81 | — | 133000 | 2.1 |
| Comparative Example 1 | Comparative Preparation Example 1 | 20 | $1.0 \times 10^{-2}$ | 30 | 900 | 99 | 69 | 2090 | 3.2 |
| Comparative Example 2 | Comparative Preparation Example 2 | 20 | $1.0 \times 10^{-2}$ | 30 0 | 120 45 | 99 No reactivity | 89 | 2330 | 2.1 |
| Comparative Example 3 | Comparative Preparation Example 3 | 20 | $1.0 \times 10^{-2}$ | 30 0 | 120 45 | 85 No reactivity | 87 | 1900 | 2.3 |
| Comparative Example 4 | Comparative Preparation Example 4 | 20 | $1.0 \times 10^{-2}$ | 30 0 | 120 45 | 82 No reactivity | 95 | 2600 | 2.2 |
| Comparative Example 5 | Comparative Preparation Example 5 | 20 | $1.0 \times 10^{-2}$ | 30 | 45 | 31 | 87 | 4220 | 2.7 |
| Comparative Example 6 | Comparative Preparation Example 6 | 20 | $1.0 \times 10^{-2}$ | 30 | 45 | 15 | 83 | 5650 | 2.2 |

In Examples 1 to 11, in which polyisobutenes were polymerized using the catalysts of Preparation Examples 1 to 3 according to the present invention, it was found that catalyst reactivity was excellent and reaction conversion ratio was high. Particularly, in Examples 1, 5 and 6, in which the reaction was performed at room temperature, it was found that the conversion ratio (%) was 99, the exo-content (%) was 88 or more, and a high reactive PB was formed in an excellent conversion ratio.

In addition, the catalyst according to the present invention was found to maintain high reactivity at 0° C. or less and possibly produced a medium molecular weight polyisobutene. Particularly, if examining Examples 3, 4, 7, 8, 10 and 11, it was found that the number average molecular weight was increased to a range of 30,000 to 100,000, with the decrease of the reaction temperature, and accordingly, the molecular weight might be controlled according to the temperature. However, in such a polyisobutene with a medium molecular weight, the exo-content was not act as a significant factor, and the exo-content was not measured.

Meanwhile, in Comparative Example 1 using a catalyst having a BF$_4$ anion instead of a bulky anion in a cation structure as in Comparative Example 2, the exo-content of polyisobutene was markedly low though the reaction was performed for 15 hours.

In addition, in the organometal catalysts of Comparative Examples 2 to 4, the conversion ratio of 82% or more and the exo-content of 87-95% were shown while maintaining relatively excellent reactivity at 30° C., but in terms of the molecular weight range, only a low molecular weight polyisobutene was obtained. In addition, if the temperature was decreased to a low temperature (less than 0° C.), catalyst activity was not found, and accordingly, the organometal catalysts of Comparative Examples 2 to 4 could not be used for the synthesis of polyisobutene having a medium or higher molecular weight.

Accordingly, if a polymerization reaction is performed at room temperature using the catalyst of the present invention, a high reactive PB having a low molecular weight may be efficiently synthesized at room temperature due to excellent catalyst activity, and in addition, if the reaction temperature is decreased to a low temperature, a polyisobutene having a medium molecular weight could be prepared, and the utilization of the catalyst is expected to be high.

Meanwhile, the catalyst of Preparation Example 3 according to the present invention had higher reactivity and a polymerization reaction could be performed in a high conversion ratio though a small amount was used when compared with the catalysts of Comparative Examples 5 and 6, which were prepared using a metal reagent as in the conventional method. In addition, the exo ratio of the polymer thus prepared, tended to decrease if a large amount of the catalyst was added due to isomerization, but the catalyst of the present invention elevated the exo ratio of an oligomer by decreasing the catalyst amount and minimizing isomerization. Particularly, in Example 9 using the catalyst of Preparation Example 3, the exo ratio of an oligomer was found high and 92%.

In addition, if the catalyst of the present invention was used, the molecular weight of the polyisobutene polymer thus prepared was in a relatively high range though using a smaller amount of the catalyst when compared with the catalyst prepared in the conventional technique. Particularly, when comparing Example 11 with Comparative Examples 5 and 6, the number average molecular weight of the polymer obtained in Example 11 was 133000, but the molecular weights of polymers obtained in Comparative Examples 5 and 6 were 4220 and 5650, and accordingly, it was found that a polymer having a high molecular weight was manufactured using a small amount of a catalyst when using the catalyst according to the present invention. Through the results, the organometal catalyst of the present invention was found to easily control the molecular weight of the polymer prepared.

In addition, since the catalyst of the present invention produces only organic materials as by-products but does not produce a metal halide, the by-products may be easily removed through drying or washing, thereby minimizing catalyst contamination.

Experimental Example 2

<Removal of Catalyst from Polymerized Polyisobutene>

After polymerizing a polyisobutene according to Example 1, the polymerized solution was passed as it was through a celite-filled column to remove a catalyst.

After that, with respect to the case of removing the catalyst through a celite filter, the case of removing the catalyst through dissolving in an organic solvent and washing, and the case of unremoving the catalyst, ICP and IC analysis were performed, respectively, according to the methods below, and the results are listed in Table 2 below.

1) Central metal (Ga, In, Al) analysis: ICP-OES (Optima 7300DV)

2) F, Cl analysis: Combustion IC (ICS-5000/AQF-2100H)

TABLE 2

| Specimen name | Cation component [mg/kg] Central metal (Ga, In, Al) | Anion component [mg/kg] | |
|---|---|---|---|
| | | F | Cl |
| Catalyst removal through PB filtering | <1 | <10 | <10 |
| Catalyst removal through PB washing | <1 | <10 | <10 |
| Unremoving PB catalyst | 2 | 40 | 45 |

The invention claimed is:

1. An organometal catalyst having a cationic metal complex and a borate bulky anion, and being represented by the following Formula 1:

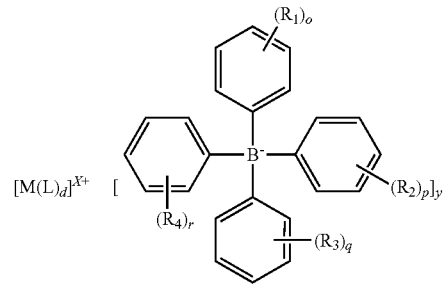

[Formula 1]

in Formula 1,

M is selected from the group consisting of Al, Ga, In and Tl,

L is each independently a coordination solvent molecule comprising a cyanide group, $R_1$ to $R_4$ are each independently hydrogen, a halogen group, or a halogen-substituted alkyl group of C1-C12, d is an integer of 1 to 10, o, p, q and r are each independently an integer of 1 to 5, and x and y are an integer of 1 to 4 and are the same to each other, wherein the organometal catalyst does not comprise a halogen salt selected from silver chloride (AgCl) lithium chloride (LiCl), sodium chloride (NaCl), potassium chloride (KCl), magnesium chloride (MgCl$_2$), silver bromide (AgBr), lithium bromide (LiBr), sodium bromide (NaBr), potassium bromide (KBr), magnesium bromide (MgBr$_2$), silver iodide (AgI), lithium iodide (LiI), sodium iodide (NaI), potassium iodide (KI) or magnesium iodide (MgI$_2$).

2. The organometal catalyst according to claim 1, wherein the borate bulky anion is one or more selected from the group consisting of tetrakis(phenyl)borate, tetrakis(pentafluorophenyl)borate, tetrakis[3,5-bis(trifluoromethyl)phenyl]borate, and the derivatives thereof.

3. The organometal catalyst according to claim 1, wherein L is one or more selected from acetonitrile, propionitrile, 2-methylpropanenitrile, trimethylacetonitrile, or benzonitrile.

4. A method for preparing the organometal catalyst according to claim 1, the method comprising:
a step of preparing a dispersion comprising a metal precursor represented by the following Formula 2 and a coordinating solvent; and
a step of reacting an organic borate compound containing carbon, silyl, or amine cation and a borate bulky anion with the dispersion:

$$M(NO_3)_f \quad \text{[Formula 2]}$$

in Formula 2,
M is selected from the group consisting of metals in group 13,
f is an integer of 3.

5. The method according to claim 4, wherein M is selected from the group consisting of Al, Ga, In and Tl.

6. The method according to claim 4, wherein the organic borate compound is represented by the following Formula 3:

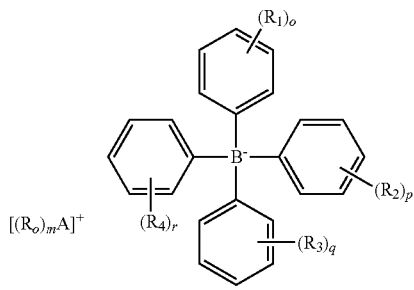

[Formula 3]

in Formula 3,
A is C, Si or N,
$R_0$ is each independently hydrogen, an alkyl group of C1-C20, an alkoxy group of C1-C20, an aryl group of C6-C20 or an aryloxy group of C6-C20,
where m is 3 if A is C or Si, or 4 if A is N,
$R_1$ to $R_4$ are each independently hydrogen, a halogen group, or a substituted or unsubstituted alkyl group of C1-C20, and
o, p, q and r are each independently an integer 1 to 5.

7. The method according to claim 6, wherein
$R_0$ is each independently hydrogen, an alkyl group of C1-C12, an alkoxy group of C1-C12, an aryl group of C6-C12 or an aryloxy group of C6-C12,
$R_1$ to $R_4$ are each independently hydrogen, a halogen group, or a halogen-substituted alkyl group of C1-C12.

8. The method according to claim 4, wherein the borate bulky anion is one or more selected from the group consisting of tetrakis(phenyl)borate, tetrakis(pentafluorophenyl)borate, tetrakis[3,5-bis(trifluoromethyl)phenyl]borate, and the derivatives thereof.

9. The method according to claim 4, wherein the coordinating solvent comprises one or more selected from acetonitrile, propionitrile, 2-methylpropanenitrile, trimethylacetonitrile, or benzonitrile.

10. The method according to claim 4, further comprising:
a step of dissolving the organic borate compound in the coordinating solvent prior to reacting with the dispersion.

11. The method according to claim 4, wherein a molar ratio of the metal precursor and the coordinating solvent is 1:6 to 1:18 in the reaction step.

12. The method according to claim 4, wherein the metal precursor is anhydrous or hydrated.

13. The method according to claim 4, wherein the dispersion further comprises a non-coordinating solvent selected from benzene, alkyl benzene, for example, toluene, xylene or ethylbenzene, chlorobenzene, bromobenzene, chloroform, dichloromethane or a combination thereof.

14. The method according to claim 4, wherein the metal precursor and the organic borate compound has a molar ratio of 1:1 to 1:4.

15. A method for preparing an oligomer, the method comprising a step of cationically polymerizing a monomer using the organometal catalyst according to claim 1.

16. The method for preparing an oligomer according to claim 15, wherein the monomer is one or more selected from the group consisting of styrene, isobutene, cyclopentadiene, dicyclopentadiene, tetrahydrofuran and the derivatives thereof.

17. A method for preparing a polymer, the method comprising a step of cationically polymerizing a monomer using the organometal catalyst according to claim 1.

* * * * *